United States Patent
Hüger et al.

(10) Patent No.: US 12,094,338 B2
(45) Date of Patent: Sep. 17, 2024

(54) METHOD FOR DETECTING A PARKING SPACE BECOMING AVAILABLE BY WAY OF AN ASSISTANCE SYSTEM COMPRISING A RADAR SENSOR, AND ASSISTANCE SYSTEM AND MOTOR VEHICLE

(71) Applicant: Volkswagen Aktiengesellschaft, Wolfsburg (DE)

(72) Inventors: Philipp Hüger, Rühen (DE); Bastian Göricke, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 349 days.

(21) Appl. No.: 17/621,141

(22) PCT Filed: Jun. 5, 2020

(86) PCT No.: PCT/EP2020/065728
§ 371 (c)(1),
(2) Date: Dec. 20, 2021

(87) PCT Pub. No.: WO2020/259986
PCT Pub. Date: Dec. 30, 2020

(65) Prior Publication Data
US 2022/0351621 A1 Nov. 3, 2022

(30) Foreign Application Priority Data
Jun. 28, 2019 (DE) .................... 10 2019 209 482.1

(51) Int. Cl.
*G08G 1/14* (2006.01)
*G01S 7/41* (2006.01)
*G01S 13/931* (2020.01)

(52) U.S. Cl.
CPC .............. *G08G 1/14* (2013.01); *G01S 7/415* (2013.01); *G01S 13/931* (2013.01); *G01S 2013/9314* (2013.01)

(58) Field of Classification Search
None
See application file for complete search history.

(56) References Cited

U.S. PATENT DOCUMENTS

2017/0294121 A1\* 10/2017 Jain ................. G01S 13/931
2019/0111916 A1   4/2019 Lee et al.
(Continued)

FOREIGN PATENT DOCUMENTS

CN   101801724 A   8/2010
CN   105160934 A   12/2015
(Continued)

OTHER PUBLICATIONS

PCT/EP2020/065728. International Search Report (Sep. 9, 2020).
DE102019209482.1. Office Action (Feb. 28, 2020).

*Primary Examiner* — Whitney Moore
(74) *Attorney, Agent, or Firm* — Peter Zura; LOZA & LOZA, LLP

(57) ABSTRACT

Technologies and techniques for detecting a parking space becoming available via an assistance system of a vehicle searching for a parking space. Radar signals are emitted by at least one radar sensor searching for the parking space and whether a parking space becoming available is recognized on the basis of received radar signals, which are evaluated by an evaluation unit of the vehicle. Micro-movements of a vehicle parked in a parking space, may characterize the vacating of the parking space, and may be detected by evaluating the radar signals reflected by this parked vehicle. A presumptive parking space becoming available may be identified by the assistance systems on the basis of such a (Continued)

detection of a micro-movement. An assistance system and a motor vehicle using the assistance system are also disclosed.

20 Claims, 1 Drawing Sheet

(56) References Cited

U.S. PATENT DOCUMENTS

| | | | |
|---|---|---|---|
| 2019/0120931 | A1 | 4/2019 | Mihajlovic et al. |
| 2019/0130747 | A1* | 5/2019 | Kurotobi ............... G01S 13/931 |
| 2020/0258385 | A1* | 8/2020 | Mahajan ............... G01S 17/931 |
| 2021/0174682 | A1* | 6/2021 | Unverdorben ......... G08G 1/143 |

FOREIGN PATENT DOCUMENTS

| | | |
|---|---|---|
| CN | 105931491 A | 9/2016 |
| CN | 109118823 A | 1/2019 |
| DE | 102011086268 A1 | 5/2013 |
| DE | 102013209298 A1 | 11/2014 |
| DE | 102015010548 A1 | 3/2016 |
| EP | 2557020 A2 | 2/2013 |
| GB | 2568264 B | 9/2020 |
| JP | 2006105865 A | 4/2006 |

\* cited by examiner

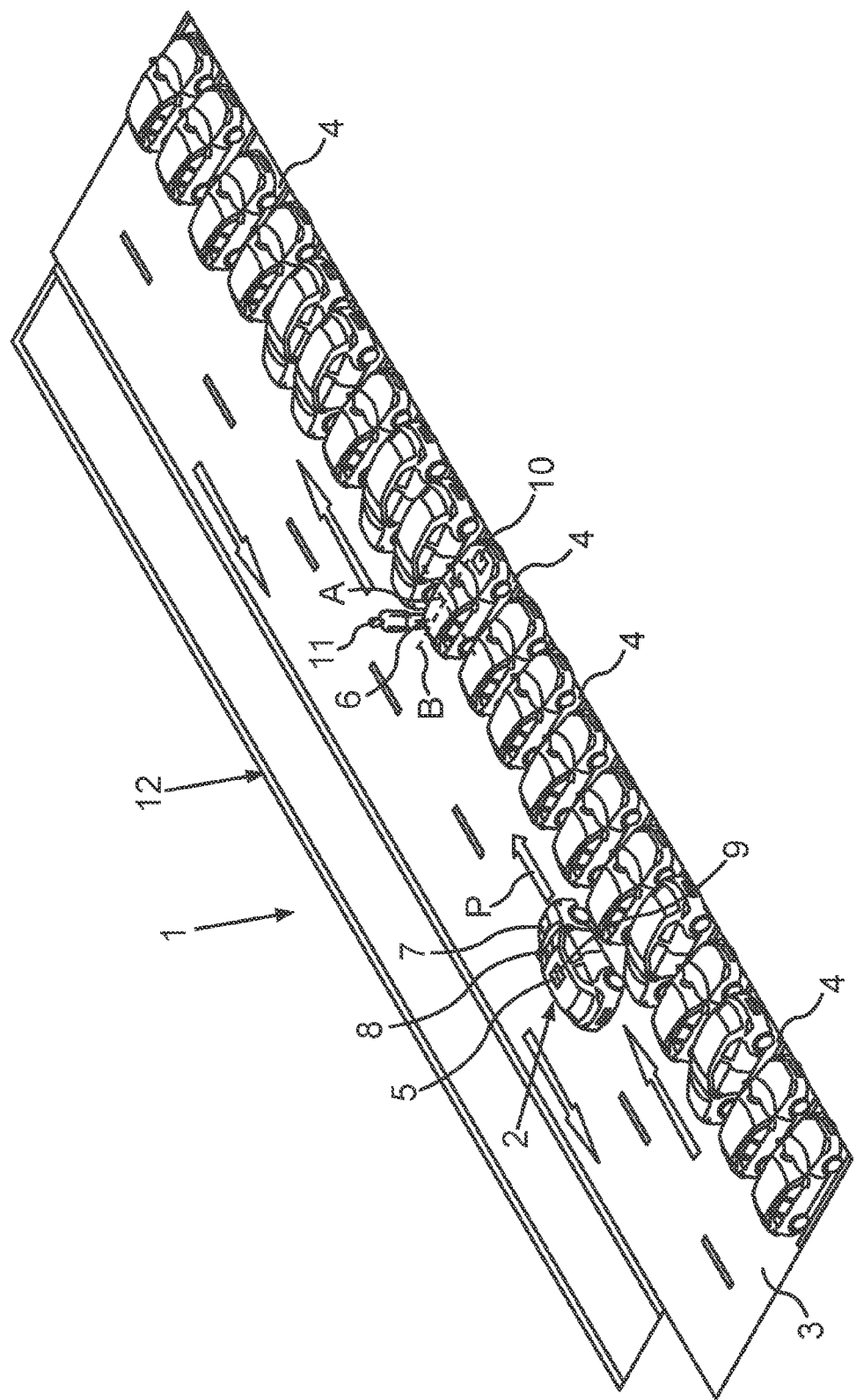

METHOD FOR DETECTING A PARKING SPACE BECOMING AVAILABLE BY WAY OF AN ASSISTANCE SYSTEM COMPRISING A RADAR SENSOR, AND ASSISTANCE SYSTEM AND MOTOR VEHICLE

RELATED APPLICATIONS

The present application claims priority to International Patent App. No. PCT/EP2020/065728 to Huger et al., filed Jun. 5, 2020, which further claims priority to German Pat. App. No. 10 2019 209 482.1 filed Jun. 28, 2019, the contents of each being incorporated by reference in their entirety herein.

TECHNICAL FIELD

Aspects of the present disclosure relate to a technologies and techniques for detecting a parking space becoming available by way of an electronic assistance system of a vehicle searching for a parking space. Radar signals may be emitted by at least one radar sensor of the searching vehicle, and whether a parking space is becoming available is recognized on the basis of received radar signals, which are received by the vehicle and evaluated by an evaluation unit of the vehicle. Another aspect of the present disclosure relates to an electronic assistance system for a vehicle and a motor vehicle.

BACKGROUND

It is known in the art that, with an assistance system of a vehicle, an already available and unoccupied parking spot is detected, and parking is carried out in this parking space. With such systems, however, the parking space must already be available for it to be able to be detected. A disadvantage is therefore to be seen in the fact that parking spaces that will become available in the future are still detected as occupied, although they will become available imminently thereafter since a vehicle is leaving said occupied parking space. A possible parking opportunity in such a parking space that will become vacant in the near future will therefore not be detected by these assistance systems.

In addition, however, methods and systems are also known in the art which detect a potential vacancy of a parking space that is currently still occupied. This is known, for example, from DE 10 2015 010 548 A1. Similar information is also known from DE 10 2013 209 298 A1. Radar sensors are particularly advantageous especially in systems of this type for detecting that a parking space that is currently still occupied will become available in the future. They detect over a relatively large range so that a potential availability of such a parking space can be detected even at a greater distance relative to the current position of the searching vehicle. This is known, for example, from the aforementioned DE 10 2013 209 298 A1.

DE 10 2011 086 268 A1 teaches a parking space detection system for detecting parking spaces by means of an on-board sensor system of a vehicle while driving along a road.

BRIEF SUMMARY

Aspects of the present disclosure are directed to providing configurations for detecting a parking space becoming available, and an assistance system and a motor vehicle in which the detection of such situations with a radar sensor of the searching vehicle can take place even more precisely and diversely.

Various aspects are achieved by means of a method, an assistance system and a motor vehicle according to the subject matter of the claims found herein.

In some examples, a method is disclosed for detecting a parking space that is becoming available by way of an electronic assistance system of a vehicle. The vehicle is a vehicle that is searching for a parking space. With at least one radar sensor of this vehicle searching for the parking space, radar signals are emitted and, on the basis of the received radar signals received by the vehicle and evaluated by an evaluation unit of the vehicle, it is detected whether a parking space that is currently and at the time of the search still occupied will become available in the foreseeable future. Micro-movements of a vehicle that is parked in a parking space are detected by evaluating the radar signals reflected by this parked vehicle and received by the vehicle searching for a parking space. On the basis of such detection of a micro-movement, the assistance system estimates or at least suspects that the parking space will become available. Using such an approach, which is made possible especially by means of radar sensors, a parking space that is currently still occupied by a vehicle can potentially become available in a more diverse manner. Especially such micro-movements, which can then be detected in a very targeted manner by means of evaluating the received radar signals, in particular, also provide information about whether a vehicle that is located in a parking space has already been started. Since such micro-movements occur, for example, as a result of oscillations and vibrations of a motor vehicle, they can in fact be detected. In particular, it can also be concluded therefrom that the vehicle has already been started or that the drive unit of the vehicle has been activated. Even if the vehicle is not yet moving, presumably it will move or drive in the immediate future. In particular, it will leave the parking space or the parking spot. In particular, micro-movements of a vehicle parked in a parking space, which can at least characterize a vacating of the parking space, are evaluated and used to estimate or suspect that such a vacating is taking place.

For example, if in connection with such micro-movements, there is also an actual movement of the parked vehicle relative to the occupied parking space, the radar signals can be used to determine in an even more detailed manner that such a vacating is taking place. However, based on micro-movements alone that occur when the parked vehicle is at a standstill, but when the vehicle's drive unit has already been started, thus resulting in corresponding vibrations and oscillations of the vehicle, in particular the vehicle body, a potential vacating of the parking space can be suspected, or provisionally detected. The method thus makes it possible to assess situations in an even more flexible, variable, and comprehensive manner to determine whether a parking space that is currently still occupied is about to become available. This makes it possible in an even more comprehensive and diverse manner to detect, on the basis of radar signals, parking spaces that will become available in the foreseeable future and, if necessary, to be able to occupy them with the searching vehicle. This enables even more efficient parking space management regarding parking spaces that are not yet available at the time of the search and detection of them.

In particular, mechanical vibrations of the parked vehicle, which is not yet moving at the time of the detected micro-movements, are recognized as micro-movements. For example, such micro-movements may be generated when the drive unit of the vehicle is started or when the drive unit of this vehicle has been started, but the vehicle is not yet moving. Detected as micro-movements can be, in addition to or instead of the above, mechanical vibrations of the parked vehicle in the already started state of the drive unit of the vehicle. For example, there can be vibrations in the body of the vehicle that can be detected by these radar signals.

In particular, pitching movements of the parked vehicle about a transverse axis of the vehicle in the parked state and/or rolling movements of the parked vehicle about a longitudinal axis of this vehicle in the parked state can be detected as micro-movements. For example, this is the case when said parked vehicle is loaded. This can, for example, be the boarding of a passenger. Likewise, this can be, for example, the loading a trunk with objects. As, in this context, the body of the vehicle usually executes such pitching movements and/or rolling movements due to the suspension of the vehicle, these are also micro-movements in the context of the present disclosure. Such micro-movements can also be detected on the basis of the emitted and/or reflected and received radar signals.

In some examples the parked vehicle can be detected with a further acquisition unit of the vehicle searching for a parking space, wherein, on the basis of a detected person and an occurrence of a pitching movement and/or a rolling movement of the parked vehicle, it is detected that the parked vehicle will vacate the parking space. Accordingly, on the basis of these multiple pieces of information, on the one hand, about the micro-movements of the parked vehicle and, on the other hand, about the person boarding the vehicle, it can be detected that, due to these actions, it is imminent that this parked vehicle will vacate the parking space. In particular, in this context, the assistance system can arrive at an even more precise assessment of as to whether this occupied parking space will immediately become available when the sequence of these detections is taken into account. If, in this context, the person at the parked vehicle is detected first and a pitching movement and/or a rolling movement is subsequently detected, it can be concluded that the person has boarded the vehicle and vacating the parking space is imminent.

In some examples, additionally, or instead of, this can be linked to a piece of information whereby a loading action of the vehicle is detected directly by the acquisition unit, and the pitching movement and/or rolling movement of the vehicle are/is also detected. In particular, this scenario allows for the conclusion to be drawn that vacating a parking space is taking place if, following this scenario, a further pitching movement and/or rolling movement of this parked vehicle is detected. In particular, if this is linked to the person boarding the parked vehicle, the probability is further increased whereby vacating of the parking space by this parked vehicle is imminent.

Thus, in this context, not only individual events that represent micro-movements can be seen separately each taken by themselves to characterize a certain probability of a vehicle vacating a parking space and used to assess whether a parking space is potentially becoming available; but such information can be variedly linked in ways that differ in a time- and/or in an object-specific manner. In particular, this is done to specify more precisely, based on information chains, the assessment as to whether a vacating action of a parking space by the vehicle is imminent.

In some examples, it can be provided that the evaluation of the received radar signals is carried out in terms of a micro-Doppler effect that has occurred. On the basis of detected micro-Doppler shifts in the received radar signal, an operating status of the parked vehicle is detected, which at least allows for suspecting that the vehicle will vacate the parking space. Micro-movements, as mentioned above by way of example, represent micro-movement dynamics that induce Doppler modulations on the reflected and thus received radar signal, which is referred to as the micro-Doppler effect. If a target object, here, for example, the parked vehicle, has in particular mechanical vibrations or rotations, it induces a frequency modulation on the reflected radar signal, and which frequency modulation additionally generates sidebands to the Doppler frequency shift caused by this signal reflected by the target object. Detecting, acquiring, and evaluating these sidebands makes it possible, in this context, to detect a possible vacating action of a parking space at an early stage even more precisely. In particular, even if the parked vehicle is still at a standstill and there is no movement whatsoever.

It is provided that, preferably, maneuvering movements of the parked vehicle in the parking space are acquired, in particular with the radar sensor, and that a vacating of a parking space is detected based thereon.

It is preferably provided that radar signals, additionally reflected on the side of the street opposite the occupied parking space and received by the vehicle searching for a parking space, also enable that a parking space that is becoming available to be detected, a parking space which cannot be seen from the current position of the vehicle searching for a parking space. Such a configuration also makes it possible to detect, on the basis of radar signals, a potential becoming available of a parking space at an early stage, although the driver and/or other acquisition units of the vehicle cannot yet detect and see this parking space that is currently still occupied.

In general, the methods disclosed herein also enable detecting the potential becoming available of a parallel parking space or a perpendicular parking space, which both represent parking spaces.

In some examples, optical signals of the parked vehicle can also be detected by an acquisition unit, for example, an optical acquisition unit, such as a camera of the vehicle. For example, they can be turn signals or a switching on of a headlight, or the like. In addition to the information obtained as micro-movements of the parked vehicle based on the radar signals, in particular the received radar signals, in particular in comparison to the emitted radar signals, this information can also be used as a basis for assessing as to whether a parking space is becoming available.

In some examples the vehicle searching for a parking space may stop in front of the parking spot or the parking space that is potentially becoming available in order to facilitate an unhindered vacating action of the parked vehicle from the parking space. In particular, in this context, the assistance system can take corresponding actions. If the vehicle searching for a parking space is operated semi-autonomously or operated manually by a driver, the assistance system can give instructions that represent a corresponding stop at a preferred position of the vehicle. In this context, a stop can take place in the direction of travel in front of the parking space that is potentially becoming available, or the vehicle searching for the parking space can drive past the still occupied parking space and only stop thereafter in the direction of travel.

In some examples, when the assistance system detects a parking spot that will potentially become available, or a corresponding parking space, further monitoring of the parking space takes place by means of on-board sensors.

This is done in order to be able to monitor the vacating process of the vehicle that is parked in the parking space. When the vehicle that was parked in the parking space has completely vacated the parking space and the parking space is then available, the vehicle searching for the parking space can park in the space. This can be done fully autonomously, or semi-autonomously, or completely manually by a driver. Preferably, fully autonomous parking in the parking space that has then become available is carried out. For this purpose, the assistance system can determine an appropriate parking strategy, which can involve a single cycle or multiple cycles. In particular, a corresponding parking trajectory can thus be determined.

Another aspect of the present disclosure relates to an electronic assistance system for a vehicle. Said assistance system has at least one radar sensor and one evaluation unit. The assistance system is designed to carry out methods according to the aforementioned aspects or an advantageous embodiment thereof. In particular, this method is carried out with the assistance system.

Another aspect of the present disclosure relates to a motor vehicle with an assistance system according to the aforementioned aspect.

Likewise, a computer program product can be provided which has commands which, when they are executed on a data processor or a computer, enable the aforementioned methods to be carried out. Such a data processor can be, for example, the evaluation unit of the assistance system. The evaluation unit can, in principle, also be referred to as a control unit.

The present disclosure also comprises the combinations of the features of the embodiments as described.

Exemplary embodiments of the present disclosure will be described below. For this purpose, the only FIGURE shows a scenario demonstrating a method for determining a parking space that will become available.

BRIEF DESCRIPTION OF THE DRAWINGS

The present disclosure will be described in more detail hereafter based on a preferred exemplary embodiment. In the drawings:

FIG. 1 shows an illustration of a configuration for a parking process for a vehicle, under some aspects of the present disclosure.

DETAILED DESCRIPTION

The exemplary embodiment explained below is a preferred embodiment of the present disclosure. In the example, the described components of the embodiment each represent individual features of the present disclosure that are to be considered independently of one another, which also embody the present disclosure independently of one another and are therefore to be regarded as part of the present disclosure either individually or in a combination other than the one shown. Furthermore, the embodiment as described can also be supplemented by further features of the present disclosure have already been described.

FIG. 1 shows a perspective view of a traffic scenario 1. A vehicle 2, which is a motor vehicle here, in particular a passenger car, is located on a roadway 3. Off to the side of the roadway 3, for example, there is a plurality of parking spots 4, of which only a few are provided with the reference numeral for the sake of better clarity. These parking spaces 4 are configured, for example, as perpendicular parking spots. The vehicle 2 that is searching for a parking space 4 moves in the direction of the arrow P on the roadway 3. This vehicle 2 has an electronic assistance system 5. The electronic assistance system 5 is designed to detect a parking space 4 that will become available, but that, while the search is ongoing, is currently still occupied by another object, in particular another vehicle 6. In particular, this assistance system 5 is also designed to detect a free parking space 4.

The assistance system 5 is, for example, also designed to carry out an at least semi-autonomous, in particular fully autonomous, parking process of the vehicle 2 in an available parking space 4.

This assistance system 5 preferably has at least one radar sensor 7, in particular several radar sensors 7. Said at least one radar sensor 7 is arranged on the vehicle 2. The assistance system 5 preferably has at least one further acquisition unit, in particular an optical acquisition unit 8. This detection unit can, in particular, be a camera, and it can be, in particular, sensitive in the spectral range that is visible to humans.

In addition, the assistance system 5 preferably also has an evaluation unit 9. This unit is arranged in particular in the vehicle 2, as shown in the FIG.

In the exemplary embodiment, the parking spaces 4 are occupied by vehicles. In this state, the at least one radar sensor 7 of the vehicle 2 that is searching for a parking space 4 emits radar signals that are reflected off objects in the vicinity. On the basis of such reflected and received radar signals, which are received by the vehicle 2 and evaluated by the evaluation unit 9 of the vehicle 2, it is detected whether a parking space 4 will become available in the near future, but which is currently still occupied by a vehicle.

For this purpose, it is provided that micro-movements of at least one vehicle 6 that is parked in a parking space 4 are detected upon an evaluation of the radar signals reflected by this parked vehicle 6 and that are received by the vehicle 2 that is searching for a parking space 4. On the basis of such detected micro-movements, it is at least suspected or estimated, in particular by the assistance system 5, that the parking space 4 will become available.

In the exemplary embodiment it is provided that, for example, the further vehicle 6, which is parked in the parking spot or the parking space 4, performs micro-movements. Said micro-movements are detected by evaluating the previously mentioned radar signals. In particular, mechanical vibrations of the parked vehicle 6 are detected as micro-movements of the further vehicle 6. For example, these are micro-movements of the vehicle 6 occur, in particular, when a drive unit 10 of this vehicle 6 is started and/or when this drive unit 10 of this vehicle 6 has already been started. In particular, these micro-movements are in the form of mechanical vibrations that are also present when the vehicle 6 is at a standstill and not moving, and only the drive unit 10 is started or the drive unit 10 has already been started, and the further vehicle 6 is not yet moving or driving. For example, these vibrations can be corresponding mechanical vibrations of the vehicle body.

In addition to, or instead of, it can be provided that pitching movements of this parked vehicle 6 about a transverse axis A of this vehicle 6 in the parked state and/or rolling movements of this parked vehicle 6 about a longitudinal axis B of this vehicle 6 in the parked state can be detected as micro-movements.

In some examples, it can also be provided that a person 11 at the parked vehicle 6 can be detected, when a person is present, with a further acquisition unit such as, for example, acquisition unit 8 of the vehicle 2 that is searching for a parking space 4. On the basis of an acquired person 11 and an occurrence of a pitching movement and/or a rolling movement, it can be estimated that the parked vehicle 6 will vacate the parking space. In particular, this fact is suspected or estimated even more precisely than it would be possible if only micro-movements were determined on the basis of the evaluation of the radar signals.

The evaluation of the received radar signals is carried out with regard to a micro-Doppler effect that has occurred. An operating state of the parked vehicle 6 is detected on the basis of detected micro-Doppler shifts in the received radar signal, which at least allows for suspecting that a vacating action of the parking space will occur.

In addition, actually occurring maneuvering movements, which represent a movement of the parked vehicle 6 within the parking space 4, can be acquired in particular with the at least one radar sensor 7 and/or the acquisition unit 8 and, on the basis thereof, a vacating of a parking space can be detected or suspected with an even higher probability.

Likewise, it is possible for the radar signals which were reflected off the side of the street 12 opposite the occupied parking space 4 to be received by the vehicle 2 that is searching for a parking space, and thus a parking space 4 that is becoming available can be detected, which cannot be seen from the current position of the vehicle 2 that is searching for a parking space 4, and which can be assessed with regard to becoming available. For example, such a parking space, which cannot be seen from the current position of the vehicle 2, can be hidden behind other objects, such as parked vehicles and/or trees and/or walls or the like, or it can be provided in a corresponding side street to the roadway 3, from where it branches off or with which it intersects. In the FIG., this opposite side of the street 12 is therefore only symbolically indicated by the reference numeral, and it is intended to represent any condition according to which parking spaces that are currently still occupied and cannot be seen from the current position of the vehicle 2 that is searching for a parking space 4 are available. They are therefore on the side of the roadway 3 opposite the side of the street 12. Thus, they can be in the area of the parking spaces 4 shown in the FIG. or in a street that curves relative hereto, or the like.

LIST OF REFERENCE NUMERALS 1 traffic scenario
2 vehicle
3 roadway
4 parking space
5 assistance system
6 vehicle
7 radar sensor
8 acquisition unit
9 evaluation unit
10 drive unit
11 person
12 side of the street
A transverse axis
B longitudinal axis
P arrow

The invention claimed is:

1. A method for detecting a parking space for a vehicle, comprising:
 emitting and receiving radar signals via at least one radar sensor;
 evaluating the received radar signals via an evaluation unit to detect a prospective parking space, wherein the evaluating comprises detecting radar reflections from the received radar signal indicating micromovements of a vehicle parked in a parking space; and
 identifying the prospective parking space based on the evaluating,
 wherein the micromovements comprise one or more of
  mechanical vibrations of the parked vehicle associated with a starting of an engine of the parked vehicle,
  pitching movements of the parked vehicle about a transverse axis of the parked vehicle in the parked state, and/or
  rolling movements of the parked vehicle about a longitudinal axis of the parked vehicle in the parked state.

2. The method of claim 1, further comprising analyzing the pattern and intensity of the received radar signals to determine the engine's operational state, based on the mechanical vibrations detected.

3. The method of claim 1, further comprising integrating the evaluating of radar signals with data from additional sensors to confirm the trajectory and speed of the parked vehicle as it begins to vacate the parking space, and updating the status of the parking space availability based on the integrated data analysis.

4. The method of claim 3, further comprising detecting a person at the parked vehicle via a further acquisition unit of the vehicle, wherein, on the basis of an acquired person and an occurrence of the pitching movement and/or a rolling movement, the identified prospective parking space is validated.

5. The method of claim 1, wherein evaluating the received radar signals comprises evaluating the received radar signals based on a micro-Doppler effect that has occurred and, depending on detected micro-Doppler shifts in the received radar signal, an operating state of the parked vehicle is detected indicating an imminent vacating of the parking space.

6. The method of claim 1, further comprising acquiring maneuvering movements of the parked vehicle within the parking space, and, depending thereon, detecting an imminent vacating of the parking space.

7. The method of claim 1, further comprising evaluating received radar signals reflected off a side of a street opposite the prospective parking space, and identifying the prospective parking space therefrom.

8. A system for detecting a parking space for a vehicle, comprising:
 at least one radar sensor; and
 at least one evaluation unit, wherein the at least one radar sensor and evaluation unit are configured to
  emit and receive radar signals via the at least one radar sensor;
  evaluate the received radar signals via the evaluation unit to detect a prospective parking space, wherein the evaluating comprises detecting radar reflections from the received radar signal indicating micromovements of a vehicle parked in a parking space; and
  identify the prospective parking space based on the evaluating,
 wherein the micromovements comprise one or more of
  mechanical vibrations of the parked vehicle associated with a starting of an engine of the parked vehicle,
  pitching movements of the parked vehicle about a transverse axis of the parked vehicle in the parked state, and/or rolling movements of the parked vehicle about a longitudinal axis of the parked vehicle in the parked state.

9. The system of claim 8, wherein the evaluation unit is configured to process the radar signals from the at least one radar sensor to further determine if the vehicle parked in the prospective parking space has its engine running, based on the intensity and pattern of the mechanical vibrations detected, as indicative of the engine's operational state.

10. The system of claim 8, wherein the evaluation unit is configured to integrate the evaluating of radar signals with data from additional sensors to confirm the trajectory and speed of the parked vehicle as it begins to vacate the parking space, and updating the status of the parking space availability based on the integrated data analysis.

11. The system of claim 10, further comprising a further acquisition unit, operatively coupled to the evaluation unit, wherein the further acquisition unit is configured to detect a person at the parked vehicle, wherein, on the basis of an acquired person and an occurrence of the pitching movement and/or a rolling movement, the identified prospective parking space is validated.

12. The system of claim 8, wherein the at least one radar sensor and evaluation unit are configured to evaluate the received radar signals by evaluating the received radar signals based on a micro-Doppler effect that has occurred and, depending on detected micro-Doppler shifts in the received radar signal, an operating state of the parked vehicle is detected indicating an imminent vacating of the parking space.

13. The system of claim 8, wherein the at least one radar sensor and evaluation unit are configured to acquire maneuvering movements of the parked vehicle within the parking space, and, depending thereon, detecting an imminent vacating of the parking space.

14. The system of claim 8, wherein the at least one radar sensor and evaluation unit are configured to evaluate received radar signals reflected off a side of a street opposite the prospective parking space, and identifying the prospective parking space therefrom.

15. A method for detecting a parking space for a vehicle, comprising:

emitting and receiving radar signals via at least one radar sensor;

evaluating the received radar signals via an evaluation unit to detect a prospective parking space, wherein the evaluating comprises detecting radar reflections from the received radar signal indicating micromovements of a vehicle parked in a parking space, wherein evaluating the received radar signals comprises evaluating the received radar signals based on a micro-Doppler effect that has occurred and, depending on detected micro-Doppler shifts in the received radar signal, an operating state of the parked vehicle is detected indicating an imminent vacating of the parking space; and identifying the prospective parking space based on the evaluating.

16. The method of claim 15, wherein the micromovements comprise mechanical vibrations of the parked vehicle associated with a starting of an engine of the parked vehicle.

17. The method of claim 15, wherein the micromovements comprise one or more of pitching movements of the parked vehicle about a transverse axis of the parked vehicle in the parked state, and/or rolling movements of the parked vehicle about a longitudinal axis of the parked vehicle in the parked state.

18. The method of claim 17, further comprising detecting a person at the parked vehicle via a further acquisition unit of the vehicle, wherein, on the basis of an acquired person and an occurrence of the pitching movement and/or a rolling movement, the identified prospective parking space is validated.

19. The method of claim 15, further comprising acquiring maneuvering movements of the parked vehicle within the parking space, and, depending thereon, detecting an imminent vacating of the parking space.

20. The method of claim 15, further comprising evaluating received radar signals reflected off a side of a street opposite the prospective parking space, and identifying the prospective parking space therefrom.

* * * * *